(12) United States Patent
Wang

(10) Patent No.: US 11,590,544 B2
(45) Date of Patent: Feb. 28, 2023

(54) WASTE DISPOSER

(71) Applicant: Wei Wang, West Vancouver (CA)

(72) Inventor: Wei Wang, West Vancouver (CA)

( * ) Notice: Subject to any disclaimer, the term of this patent is extended or adjusted under 35 U.S.C. 154(b) by 383 days.

(21) Appl. No.: 16/993,100

(22) Filed: Aug. 13, 2020

(65) Prior Publication Data

US 2021/0046526 A1 Feb. 18, 2021

(30) Foreign Application Priority Data

Aug. 16, 2019 (CN) .......................... 201910759334.X
Aug. 16, 2019 (CN) .......................... 201921332602.1

(51) Int. Cl.
| | | |
|---|---|---|
| *B09B 3/40* | (2022.01) | |
| *B02C 18/14* | (2006.01) | |
| *B02C 23/20* | (2006.01) | |
| *C02F 11/12* | (2019.01) | |
| *F26B 1/00* | (2006.01) | |

(Continued)

(52) U.S. Cl.
CPC .............. *B09B 3/40* (2022.01); *B02C 18/142* (2013.01); *B02C 23/20* (2013.01); *C02F 11/12* (2013.01); *C02F 11/131* (2019.01); *F26B 1/005* (2013.01); *F26B 3/347* (2013.01)

(58) Field of Classification Search
CPC ......... B09B 3/40; B02C 18/142; B02C 23/20; B02C 18/0092; C02F 11/12; C02F 11/131; F26B 1/005; F26B 3/347
See application file for complete search history.

(56) References Cited

U.S. PATENT DOCUMENTS 2,148,447 A * 2/1939 Dundas .................. C02F 11/13
241/43
3,744,145 A * 7/1973 Maxwell .................. F26B 3/00
110/227

(Continued)

FOREIGN PATENT DOCUMENTS

| AU | 2009206999 | 7/2009 |
|---|---|---|
| CN | 201720243 | 1/2011 |

(Continued)

*Primary Examiner* — David J Laux
(74) *Attorney, Agent, or Firm* — Davis Wright Tremaine LLP; Heather M. Colburn

(57) ABSTRACT

A waste disposer comprising a primary dehydrating chamber, a grinding device, a secondary dehydrating chamber, and a storage chamber. The primary dehydrating chamber is adapted to allow waste to be heated therein to partly dehydrate the waste. The primary dehydrating chamber has: a first waste inlet for receiving the waste, a first vapor outlet for exhausting vapor from the waste, a drainage outlet for draining free liquid from the waste, and a first waste outlet for outputting the partly dehydrated waste. The grinding device is adapted to receive the waste from the first waste outlet and grind the waste to reduce the size thereof. The secondary dehydrating chamber is adapted to allow the ground waste to be heated therein to further dehydrate the waste. The secondary dehydrating chamber has a second waste inlet for receiving the ground waste, a second vapor outlet for exhausting vapor from the waste, and a second waste outlet for outputting the further dehydrated waste. The storage chamber is adapted to receive the waste from the second waste outlet and store the waste in the storage chamber.

23 Claims, 8 Drawing Sheets

(51) Int. Cl.
*F26B 3/347* (2006.01)
*C02F 11/131* (2019.01)

(56) References Cited

U.S. PATENT DOCUMENTS

| | | | |
|---|---|---|---|
| 5,276,924 A | | 1/1994 | Hachima |
| 7,966,744 B2* | | 6/2011 | Kim .................. F26B 15/14 |
| | | | 34/384 |
| 10,159,986 B2* | | 12/2018 | Lee .................. B02C 23/10 |
| 2014/0117126 A1* | | 5/2014 | Ceru ................. E03C 1/2665 |
| | | | 241/23 |

FOREIGN PATENT DOCUMENTS

| | | |
|---|---|---|
| CN | 106423380 | 2/2017 |
| CN | 206929778 | 1/2018 |
| CN | 207294551 | 5/2018 |
| CN | 109082287 | 12/2018 |
| CN | 109896719 | 6/2019 |

\* cited by examiner

WASTE DISPOSER

TECHNICAL FIELD

The present disclosure relates to the field of a waste disposer and, in particular, to a device used for dehydrating organic waste and/or excrement and converting the same into dry particles.

BACKGROUND

In general, garbage generated from households includes inorganic waste, organic waste, and excrement, in which the latter two accounts for about 60 to 70% of the total weight. Moisture within organic waste accounts for more than 80% of the weight, and moisture within excrement accounts for more than 90% of the weight. This means that the water or moisture content weighs about 50% of all the garbage generated from households. The water content in the garbage constitutes a threat to the environment and a problem for industrial treatment, which seriously affects processes such as storage, transportation, recycling, landfill, and incineration.

Kim disclosed a food waste treatment process in U.S. Pat. No. 7,966,744. It uses a pulverizer to first pulverize food waste and distribute the waste into multiple containers for being heated by microwave. It incorporates a series of containers moving on an endless track. There are also a number of magnetrons, which generate microwave radiation, used to heat the waste as it passes by. However, the entire system is very bulky and involves many components.

Hachima disclosed an excrement disposer used with a toilet in U.S. Pat. No. 5,276,924. It requires a water absorbing agent to contact with excrement for a period of time to absorb moisture before the waste proceeds to be heated by microwave. However, the supply of the water absorbing agent, which is essential for this disposer, makes it not convenient and efficient to use.

Accordingly, there is a need for a system that is more compact and can dehydrate waste more efficiently.

SUMMARY

According to one aspect of the disclosed subject matter, there is provided a waste disposer for disposing waste having a liquid content, and comprising a heater, a primary dehydrating chamber, a grinding device, a secondary dehydrating chamber, and optionally a storage chamber. The heater is operable to vaporize at least some liquid in the waste. The primary dehydrating chamber is thermally communicative with the heater and comprises a first waste inlet for receiving the waste, a first vapor outlet for exhausting vaporized liquid from the waste heated in the primary dehydrating chamber, a drainage outlet for draining free liquid from the waste, and a first waste outlet for outputting a partly dehydrated waste from the primary dehydrating chamber. The grinding device is communicative with the first waste outlet and is operable to grind the partly dehydrated waste. The secondary dehydrating chamber is thermally communicative with the heater and comprises a second waste inlet communicative with the grinding device and for receiving a ground partly dehydrated waste, a second vapor outlet for exhausting vaporized liquid from the ground partly dehydrated waste heated in the secondary dehydrating chamber, and a second waste outlet for outputting a ground further dehydrated waste from the secondary dehydrating chamber. The storage chamber can be communicative with the second waste outlet, for receiving the ground further dehydrated waste. The heater can comprise a microwave generator and a waveguide connecting the microwave generator to a first microwave inlet on the primary dehydrating chamber and to a second microwave inlet on the secondary dehydrating chamber.

The waste disposer can further comprise a controller, a first temperature sensor in the primary dehydrating chamber and communicative with the controller, and a second temperature sensor in the secondary dehydrating chamber and communicative with the controller. The controller has a memory with program code that when executed instructs the microwave generator to stop generating microwaves when a temperature detected by the first temperature sensor reaches a first level or the temperature detected by the second temperature sensor reaches a second level. The waste disposer can also comprise a first humidity sensor in the primary dehydrating chamber and communicative with the controller, and a second humidity sensor in the secondary dehydrating chamber and communicative with the controller. The program code when executed can instruct a first drive motor to actuate a first shield door on the first waste outlet to open when a humidity detected by the first humidity sensor drops below a first threshold and instruct a second drive motor to actuate a second shield door on the second waste outlet to open when a humidity detected by the second humidity sensor drops below a second threshold. Each of the first and second shield doors can comprise two portions, each portion being moveable along a guide track as the first shield door or the second shield door opens or closes. Alternatively, each of the first and second shield doors can comprises a sliding door.

The primary dehydrating chamber can comprise an outer shell, in which case the first waste inlet and the first vapor outlet are located at a top of the outer shell while the drainage outlet and the first waste outlet are located at a bottom of the outer shell. The first waste outlet can be arranged on the primary dehydrating chamber to span from the bottom of the primary dehydrating chamber to between ⅓ to ½ of the overall height of the primary dehydrating chamber.

The primary dehydrating chamber can further comprise an inner shell having an exit coupling to the first waste outlet on the outer shell and a stirrer movable within the inner shell for stirring waste therein. The inner shell can comprise a filter communicative with the drainage outlet and comprising at least one of a plurality of apertures and a plurality of scales. The stirrer can comprise at least one arm that is rotatable around the inner shell, and can have a shape following a shape of the inner shell and be spaced from the inner shell to define a gap. The surface of the at least one arm can be texturized to diffusely reflect the microwaves within the primary dehydrating chamber. The stirrer can be rotatable between 0 and 30 RPM.

The grinding device can comprise a grinder motor, a grinder frame comprising a pair of laterally spaced drive shafts coupled to the grinder motor, and a plurality of grinders mounted to the drive shafts in a staggered manner. Each of the plurality of grinders can have a spindle shape with two opposing faces each comprising a plurality of distributed protrusions, and a circumferential edge comprising a plurality of spaced teeth.

The waste disposer can further comprise a blower, and the secondary dehydrating chamber can further comprise a plurality of air ducts and a plurality of air outlets, wherein each of the plurality of air ducts is fluidly communicative with the blower and positioned to create a cyclone inside the secondary dehydrating chamber when the blower is operating. Each of the air ducts can have a tapered shape facing an interior of the secondary dehydrating chamber to speed up air flow therein.

The waste disposer can further comprise a water filtration device fluidly coupled to the first and second vapor outlets and operable to filter water from the vaporized liquid.

According to another aspect method of the disclosed subject matter, there is provided a method for disposing waste having a liquid content, comprising: in a primary dehydrating chamber, heating the waste until at least some of the liquid content is vaporized and draining free liquid from the waste, to produce a partly dehydrated waste; grinding the partly dehydrated waste to produce ground partly dehydrated waste; and, in a secondary dehydrating chamber, heating the ground partly dehydrated waste to further vaporize the liquid content and produce a ground further dehydrated waste. The method can further comprise storing the ground further dehydrated waste in a storage chamber.

The configuration of the waste disposer or the process of disposing waste in accordance with embodiments of the subject matter described herein allows the dehydration process to be done in three stages. The first stage involves a primary heating that partly removes moisture from the waste. The second stage involves a grinding process that substantially reduces the size of the waste into smaller pieces. The third stage involves a secondary heating that fully removes moisture from the ground waste. The inventor found that a combination of the three stages is particularly effective and efficient in disposing organic waste or excretion because it can for example reduce typical kitchen organic waste by about 80% in terms of weight and by about 95% in terms of volume in a short period of time. The final product is in the form of small and dry particles with a size similar to coffee beans, without unfavorable smells. In addition, the final product is suitable to be used as fertilizers, thus greatly reducing the amount of waste generated by human activities. Therefore, the waste disposer is very useful for various environments such as households, hotels, and restaurants. It can be used in urban areas as well as remote areas such as islands and desert where sewage is usually inaccessible.

It is to be understood that this Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

These and other features of the disclosure will become more apparent in the following detailed description in which reference is made to the appended drawings, wherein.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

Unless defined otherwise, all technical and scientific terms used herein have the same meaning as commonly understood by one of ordinary skill in the art to which this disclosure relates.

As used herein, the term "includes" and its variants are to be read as open terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

As used herein, the term "waste" refers to disposable materials generated from human activities. The term "organic waste" refers to left-over organic matter such as from restaurants, hotels, and households. The term "excrement" refers to feces and/or urine discharged from human bodies or from animals.

In general, organic waste and excrement includes liquid in two forms, which are free liquid and bound liquid (usually free water and bound water). Free liquid is not combined with or absorbed by any solid components and can flow freely, so it can be removed with a filter and a drainage pipe. Bound liquid cannot be removed easily, but contributes most of the volume and weight of the waste. It is thus important to remove bound liquid effectively and efficiently from the waste.

Figure 1:
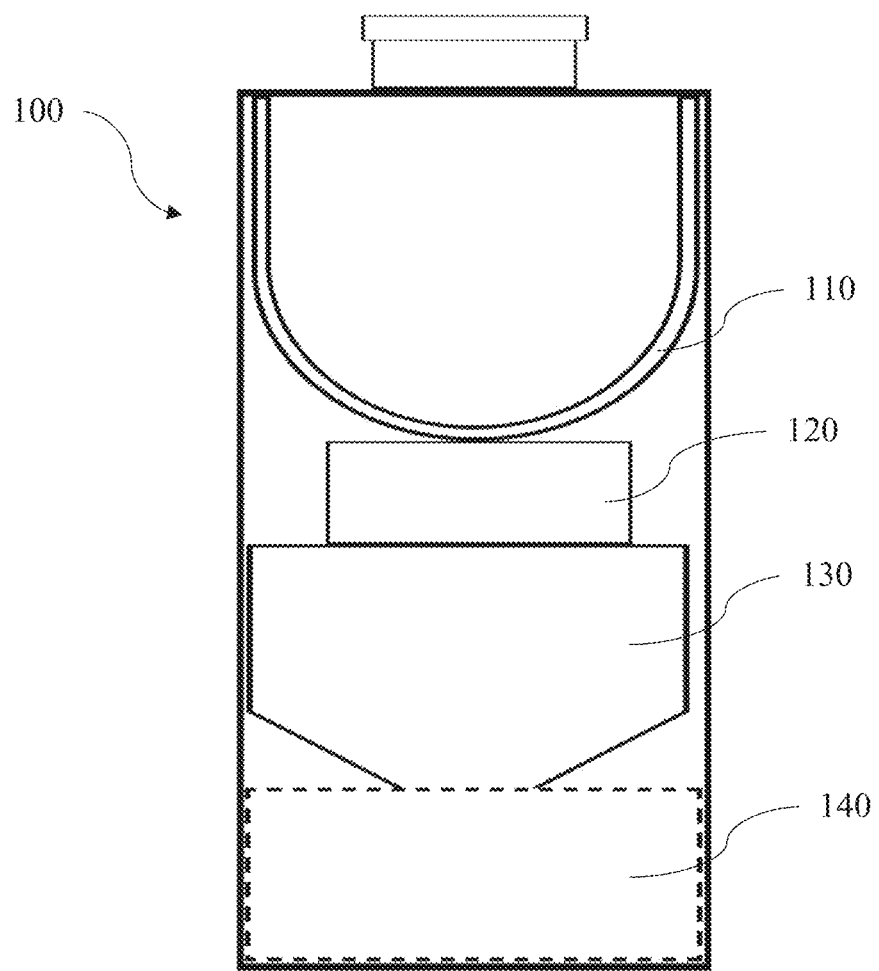
FIG. 1 illustrates a schematic sectional side view of a waste disposer according to one embodiment of the subject matter described herein.

FIG. 1 illustrates a schematic sectional view of a waste disposer 100 according to one embodiment of the subject matter described herein. In this embodiment, the waste disposer 100 includes a primary dehydrating chamber 110, a grinding device 120, and a secondary dehydrating chamber 130. The waste disposer 100 may additionally include a storage chamber 140. A controller (not shown) is communicative with sensors and components in each of the primary dehydrating chamber 110, grinding device 120, and secondary dehydrating chamber 130, and has a non-transitory memory comprising a control program for receiving measurement data from the sensors and for controlling operation of the components, as will be described in more detail below.

As can be seen in FIG. 1, the primary dehydrating chamber 110 is arranged at the top of the waste disposer 100 so that waste can be received from the top of the waste disposer 100. However, it is to be appreciated that waste can also be received from one side of the waste disposer 100, as long as the waste is able to enter the internal space of the primary dehydrating chamber 110. Although the main target to be disposed by the waste disposer 100 in the embodiments includes household waste and/or excrement, there can be other types of waste suitable to be disposed by the waste disposer 100, such as organic waste from food factories.

The primary dehydrating chamber 110 is operable to remove free liquid from the waste when the waste is placed within the primary dehydrating chamber 110. In some embodiments, the primary dehydrating chamber 110 comprises a filter to mechanically separate the free liquid from solid waste, and a drainage pipe to drain free water from the primary dehydrating chamber 110. The drainage process will be explained in more detail later. The primary dehydrating chamber 110 is also operable to partially dehydrate the waste. In other words, the primary dehydrating chamber 110 is operable to partly remove bound liquid from the waste. In some embodiments, the primary dehydrating chamber 110 comprises a heating device operable to thermally separate some of the bound liquid from the solid waste, by heating some of the bound liquid into vapor, which then separates from the solid waste. The heating process will be explained in more detail later.

After the waste is heated and partly dehydrated to a certain level in the primary dehydrating chamber 110, the waste is moved into the grinding device 120 positioned beneath the primary dehydrating chamber 110. In the grinding device 120, the partly dehydrated waste is ground to substantially reduce the size of the waste for further dehydration.

The secondary dehydrating chamber 130 is arranged beneath the grinding device 120 to directly receive the ground waste therefrom. In the secondary dehydrating chamber 130, any bound liquid left in the waste can be mostly removed. In other words, the secondary dehydrating chamber 130 is operable to further remove remaining bound liquid from the waste to an extent that the final product is dry. In some embodiments, the secondary dehydrating chamber 130 comprises a heating device operable to thermally separate most or all of the remaining bound liquid from the solid waste, by heating the bound liquid into vapor, which then separates from the solid waste.

After the waste is heated and fully dehydrated in the secondary dehydrating chamber 130, the waste moves into the storage chamber 140 beneath the secondary dehydrating chamber 130. The final dehydrated product is in the form of small and dry particles typically ranging from 2 to 10 millimeters. Because most, if not all, moisture has been removed from the waste before it enters the storage chamber 140, the waste is not expected to produce an unpleasant smell in the storage chamber 140 even over a long period of time, such as several months. In general, for typical kitchen waste that mainly includes left-over food, the volume of the waste after being heated in the secondary dehydrating chamber 130 can be about 5% of the original volume, and the weight of the waste after being heated in the secondary dehydrating chamber 130 can be about 20%.

In one embodiment, the primary dehydrating chamber 110, the grinding device 120, the secondary dehydrating chamber 130, and the storage chamber 140 are arranged within a single housing. However, in some other scenarios, one or more of the components can be arranged separately from the housing. For example, the storage chamber 140 can be attached to the housing as an accessory. In some scenarios, the waste disposer 100 may not include the storage chamber 140 and the user can put a separate receptacle, such as a wastebasket, beneath the secondary dehydrating chamber 130 to receive the fully dehydrated waste therefrom.

Figure 2:
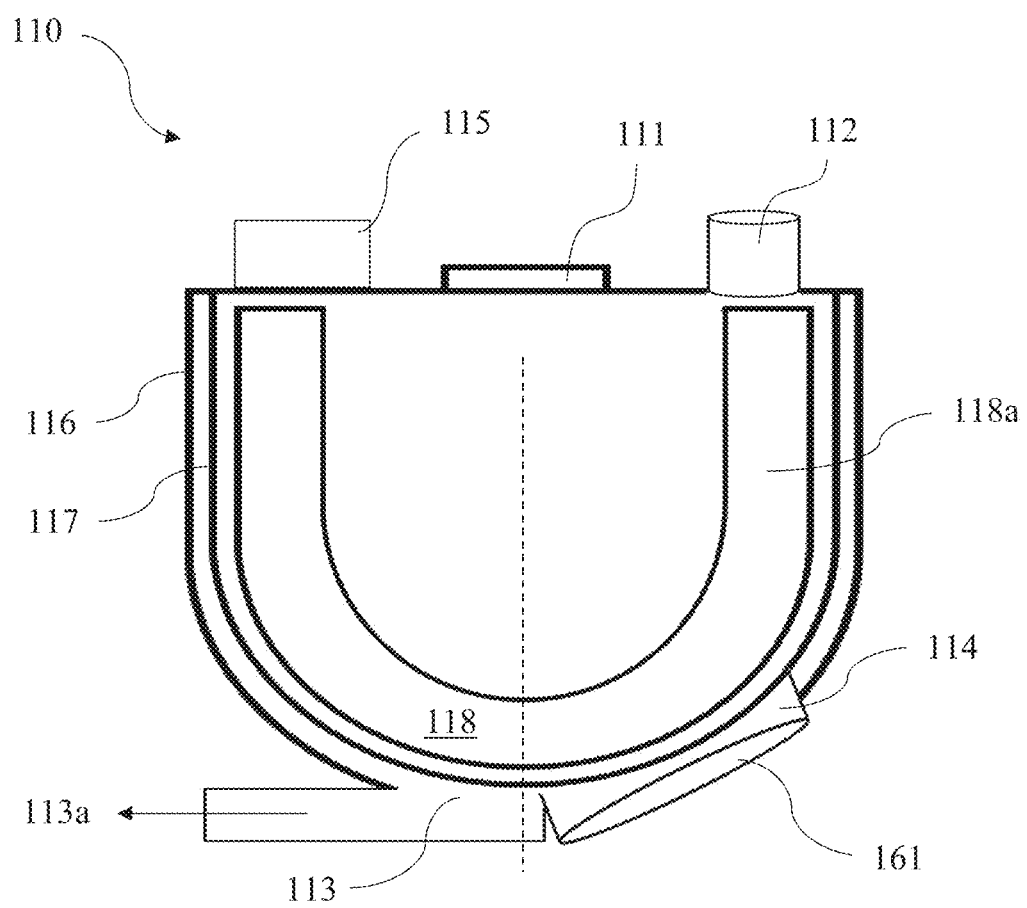
FIG. 2 illustrates a schematic sectional side view of a primary dehydrating chamber of the waste disposer, according to one embodiment of the subject matter described herein.

FIG. 2 illustrates a schematic sectional view of the primary dehydrating chamber 110 according to one embodiment of the subject matter described herein. In this embodiment, the primary dehydrating chamber 110 includes a first waste inlet 111 for receiving the waste, a first vapor outlet 112 for exhausting vapor from the waste heated in the primary dehydrating chamber 110, a drainage outlet 113 for draining free liquid from the waste out of the waste disposer 100, and a first waste outlet 114 for outputting the partly dehydrated waste from the primary dehydrating chamber 110.

Although the first waste inlet 111 is located atop the primary dehydrating chamber 110 in this embodiment, it can be arranged elsewhere as long as the waste can enter the primary dehydrating chamber 110. Typically, the first waste inlet 111 is sized with a diameter of 80 to 100 millimeters, so that large objects cannot be put into the waste disposer 100. The first vapor outlet 112 is preferably located at the top of the primary dehydrating chamber 110 because the vapor from the waste has a high temperature and will tend to rise. However, it is to be appreciated that the first vapor outlet 112 can alternatively be placed in a different location, such as arranged on the side wall of the primary dehydrating chamber 110. The drainage outlet 113 and the first waste outlet 114 are preferably located at the bottom or at least close to the lowest portion of the primary dehydrating chamber 110, so that free liquid can naturally flow by gravity into a channel connecting to the drainage outlet 113 and the waste can enter the grinding device 120 below the primary dehydrating chamber 110.

In one embodiment, the primary dehydrating chamber 110 includes an outer shell 116 and an inner shell 117 placed within the outer shell 116. The first waste outlet 114 is formed on the outer shell 117. The inner shell 116 preferably covers the bottom portion and the side wall of the outer shell 116 with a small gap in between. The inner shell 116 has an exit (not shown) coupling to the first waste outlet 114 on the outer shell 117 so the waste can leave the internal space of the inner shell 117 through the exit. A large quantity of apertures (not shown) are formed at the bottom of the inner shell 117 and act as a filter, so that free liquid from the waste can flow through the inner shell 117 to the drainage outlet 113 on the outer shell 116. Additionally or alternatively, the side wall of the inner shell 116 can comprise a number of scales overlapping with each other (not shown), so that free liquid can also exit the inner shell 116 from the slots formed between the scales. The overlapped scales allow liquid to escape while reducing the possibility of blockage by small particles or residues from the waste.

In one embodiment, free liquid is collected through the drainage outlet 113 along a channel in the direction denoted by 113a in FIG. 2. Free liquid is preferably exhausted directly out of the waste disposer 100. For example, the channel can be connected to house sewage.

In one embodiment, the heating process in the primary dehydrating chamber 110 can be realized by microwave radiation and the heating devices comprise a microwave generator (not shown). A first microwave inlet 115 can be arranged on the primary dehydrating chamber 110 to guide microwaves generated by the microwave generator via a waveguide (not shown), and the microwaves enter the primary dehydrating chamber 110 to heat up the waste. As is well understood in the art, microwaves can effectively heat and evaporate water over a period of time. The microwave generator can be placed anywhere within the waste disposer 100, and the power of a typical microwave generator ranges from 500 to 1,500 W. Although microwave energy is generally effective and efficient to dehydrate the waste, it is to be appreciated that other heating means can be used as well, such as infrared radiation.

In one embodiment, the primary dehydrating chamber 110 includes a stirrer 118 for stirring the waste within the inner shell 117 especially when the waste is being heated. The stirring can speed up the heating process. Preferably, the stirrer 118 can rotate about a centerline of the inner shell 117, as denoted by a dashed line in FIG. 2, at a rotational speed no more than 30 RPM, preferably no more than 20 RPM. The stirrer 118 can include an arm 118a extending from the bottom of the inner shell 117 to the top of the outer shell 116, so the stirrer 118 runs through the entire primary dehydrating chamber 110 as it rotates. In a preferred embodiment, the stirrer includes two arms 118a. It is to be appreciated that the quantity of the arms 118a is not to be limited herein.

In one embodiment, the arm 118a of the stirrer 118 has a shape following the wall of the inner shell 117, and a gap is thus formed between the arm 118a and the wall of the inner shell 117. Preferably, such a gap is ranged from 5 to 10 millimeters, for example: 7 millimeters, 8 millimeters, or 9 millimeters. The inner surface of the top plate of the outer shell 116 can further have a guide track thereon to guide the top portion of the arm 118a. In this way, the gap between the arm 118a and the inner shell 117 can be maintained as the stirrer 118 rotates.

In a preferred embodiment, the surface of the arm 118a is texturized to facilitate diffuse reflection of the microwave within the primary dehydrating chamber 110. For example, the texturized surface is configured so that there can be numerous ridges and valleys on the surface and the microwave can be reflected randomly as the arm 118a rotates in the inner shell 117. In this way, the waste will be heated more evenly in the primary dehydrating chamber 110. Preferably, the surface of the arm 118a is configured to be effective in reflecting microwave. For example, the arm 118a can be made of metal, or the surface of the arm 118a can be coated with or covered by a layer of metal.

Figure 7:
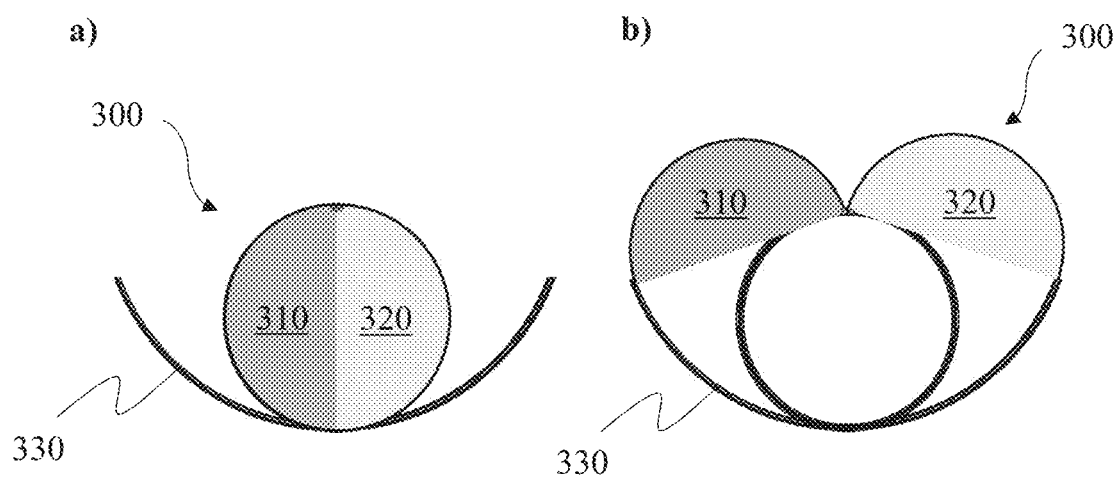
FIGS. 7(*a*) and (*b*) illustrate schematic views of a shield door of the waste disposer in closed and opened positions respectively, according to one embodiment of the subject matter described herein.
Figure 8:
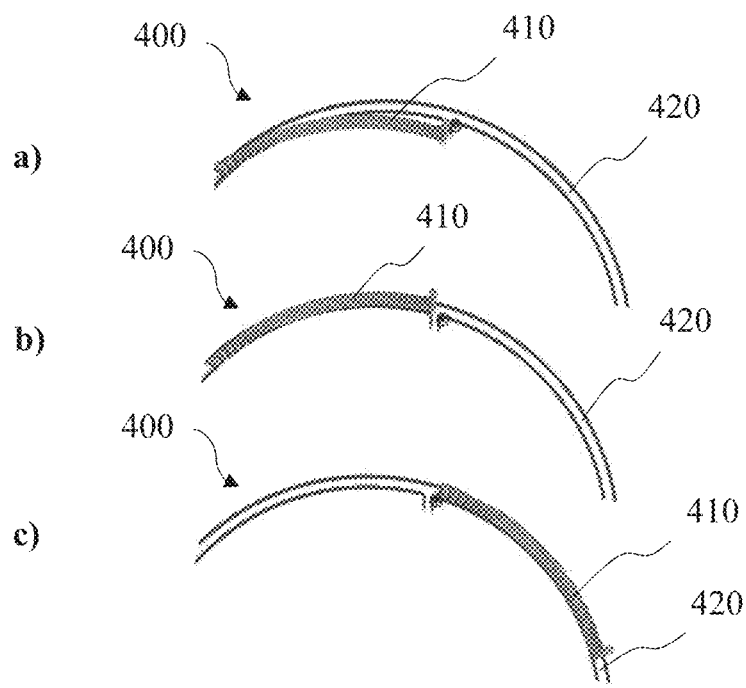
FIGS. 8(*a*)-(*c*) illustrate schematic views of a shield door at different positions, according to another embodiment of the subject matter described herein.

A first shield door 161 can be arranged on the first waste outlet 114, and can have a configuration as shown in FIG. 7 or 8, described in detail below. The first shield door 161 can be actuated by a first drive motor to open or close the first waste outlet 114. When the waste is being stirred and heated in the primary dehydrating chamber 110, the first shield door 161 is closed and thus it seals the first waste outlet 114 and prevents the waste from coming out of the primary dehydrating chamber 110. When the waste has been dehydrated to a certain extent, the first shield door 161 opens, allowing the waste to be pushed down to the grinding device 120 by the stirrer 118, for example.

In one embodiment, the first waste outlet 114 is arranged on the primary dehydrating chamber 110 so that it spans from the bottom of the primary dehydrating chamber 110 to approximately ⅓ to ½ of the overall height of the primary dehydrating chamber 110. Therefore, when the first shield door 161 is fully opened, the first waste outlet 114 is large enough for the waste to be pushed down to the grinding device 120.

In one embodiment, sensors can be arranged within the primary hydrating chamber 110 to help monitor the change of humidity and/or temperature. A humidity threshold can be set for the primary dehydrating chamber 110 to determine when the dehydration process should be stopped. The humidity and/or temperature sensors are communicative with the controller, which receives humidity and/or temperature measurement data therefrom. A position sensor can be provided to detect the position of a lid over the top of the water inlet 111, and which is communicative with the controller. The controller is also communicative with the microwave generator, stirrer 118, and first drive motor, and operable to control these components.

The controller is programmed to control the operation of the primary hydrating chamber 110. The programmed operation of the primary dehydrating chamber 110 with a humidity sensor can be described as follows. First, the position sensor notifies the controller when a user opens a lid over the top of the first waste inlet 111 and dumps waste into the inner shell 117. When the user closes the lid, the controller instructs the stirrer 118 and the microwave generator to start operating so that the stirrer 118 rotates slowly in the inner shell 117 at about 20 RPM and the generated microwaves are guided into the primary dehydrating chamber 110. Meanwhile, free liquid will flow out of the primary dehydrating chamber 110 towards the drainage outlet 113, via the apertures on the bottom of the inner shell 117 and the slots between the scales of the inner shell 117. As the stirrer 118 stirs the waste, the humidity sensor detects the humidity within the primary dehydrating chamber 110 in real time. When the humidity drops below a predetermined threshold, the controller instructs the microwave generator to stop operation and instructs the first derive motor to open the first shield door 161, resulting in the waste being pushed down to the grinding device 120 by the arm 118a of the stirrer 118 as the arm 118a rotates. For example, such a predetermined threshold of humidity can be 50%. This means that the waste leaving the primary dehydrating chamber 110 will be partly dehydrated to a preset level.

Additionally, a temperature threshold can be set for the primary dehydrating chamber 110 as well to prevent overheating the waste. Overheating may result in external hardening of the waste, which makes it difficult to further dehydrate the waste. Therefore, it can be important to control the temperature in the primary dehydrating chamber 110. For example, when the temperature sensor detects that the temperature within the primary dehydrating chamber 110 exceeds 90 degrees Celsius, the controller instructs the microwave generator to pause operation until the temperature drops below a certain level, such as 70 degree Celsius. However, it is to be appreciated that the use of various sensors is not necessary, and the user may manually set time durations on the controller for the primary hydration process.

The configuration of the primary dehydrating chamber 110 according to the embodiments as described above is advantageous at least in that: (i) the stirrer 118 is able to constantly stir the waste in the course of dehydration so free liquid from the waste can be removed sufficiently; (ii) the rugged surface on the arm 118a of the stirrer 118 facilitates diffuse reflection of microwave so the waste can be heated evenly and thoroughly; (iii) after the first shield door 161 opens, the rotation of the stirrer 118 keeps pushing the waste down to the grinding device 120; and (iv) the use of sensors allows an automatic operation to dehydrate the waste to a predetermined level without overheating the waste during the operation.

Figure 3:
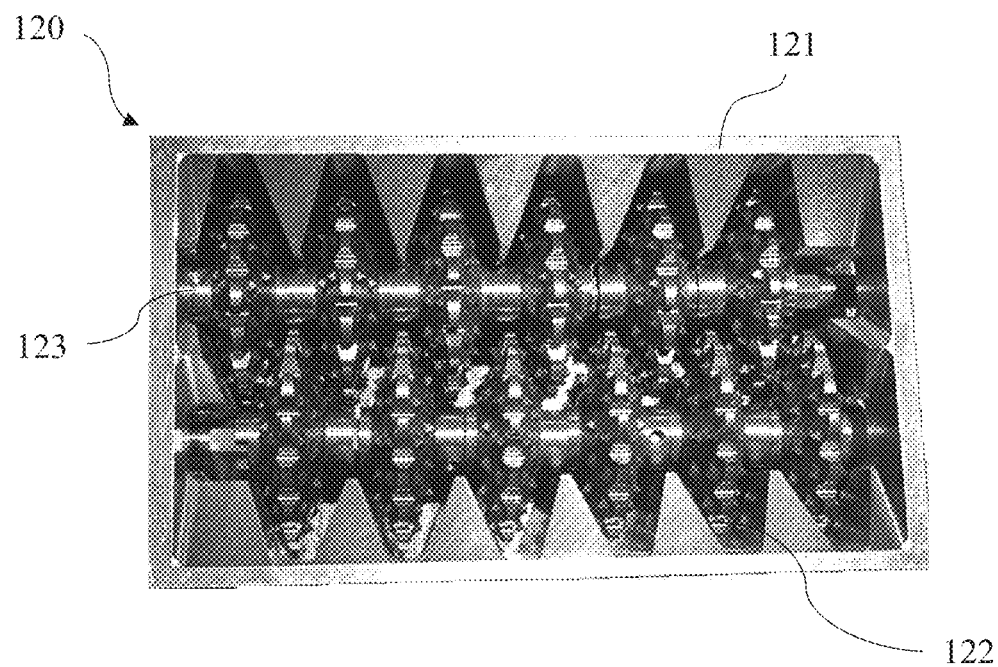
FIG. 3 illustrates an example photo of a prototype of a grinding device of the waste disposer, according to one embodiment of the subject matter described herein.

FIG. 3 illustrates an example photo of a prototype of the grinding device 120 according to one embodiment of the subject matter described herein. As shown, the grinding device 120 includes a grinder frame 121 and a plurality of grinders 122 placed on the grinder frame 121 in a staggered manner. The grinders 121 can be actuated by a grinding motor (not shown), which is communicative with the controller and can be located within the waste disposer 100 or outside of the waste disposer 100, to reduce the size of the waste. The waste leaving the primary dehydrating chamber 110 enters the grinding device 120 through a slightly tapered channel, meaning that the entrance of the grinding device 120 is slightly smaller in size than the first shield door 161. When the first shield door 161 opens, the waste is pushed down by the rotating stirrer 118 towards the grinders 122. In the meantime, the controller instructs the grinding motor to drive the grinders 122 to drag the waste into the grinding device 120. As shown in FIG. 3, the grinders are positioned on two laterally spaced shafts 123 and the two shafts 123 are rotatably mounted onto the grinder frame 121 in parallel. The shafts 123 rotate in opposite directions so that any objects appearing above the grinding device 120 will be caught in between the shafts 123. The grinders 122 are arranged so that the gap between them is suitable to smash and rip the waste into smaller particles. In one example, the grinding device 120 is placed horizontally below the primary dehydrating chamber 110, and the top side of the grinder frame 121 is sized approximately to 100×200 millimeters.

Figure 4:
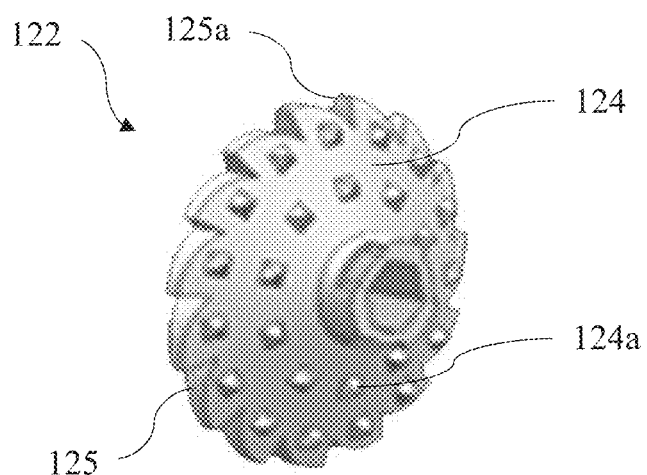
FIG. 4 illustrates a schematic perspective view of a grinder of the grinding device, according to one embodiment of the subject matter described herein.

FIG. 4 illustrates a schematic view of the grinder 122 according to one embodiment of the subject matter described herein. As shown, each of the grinders 122 is shaped as a spindle having two opposite faces 124 and a circumferential edge 125 between the two opposite faces 124. The grinder 122 is fixedly mounted onto the shaft 123 so that it can be rotated by the shaft 123. In this example, there are a number of protrusions 124a formed or distributed on each of the two opposite faces 124, so the protrusions 124a on adjacent grinders 122 help smash the waste in between and drag the waste into the grinding device 120 from above, as the grinders rotate. In this example, there are also a number of teeth 125a formed or distributed on the circumferential edge 125, to rip or tear the waste into smaller residues.

In this particular embodiment, both the protrusions 124a and the teeth 125a are incorporated. This is preferred because the inventor found that a combination of the smashing and ripping motions on the waste is the most effective and efficient in reducing the size of the waste. However, it is to be appreciated that the grinder can have only protrusions 124a or teeth 125a, and arrangement of the protrusions 124a or the teeth 125a can be different, and other types of grinders may also function as long as they are effective in reducing the size of the waste, even if it contains hard materials such as bones and shells.

Figure 5:
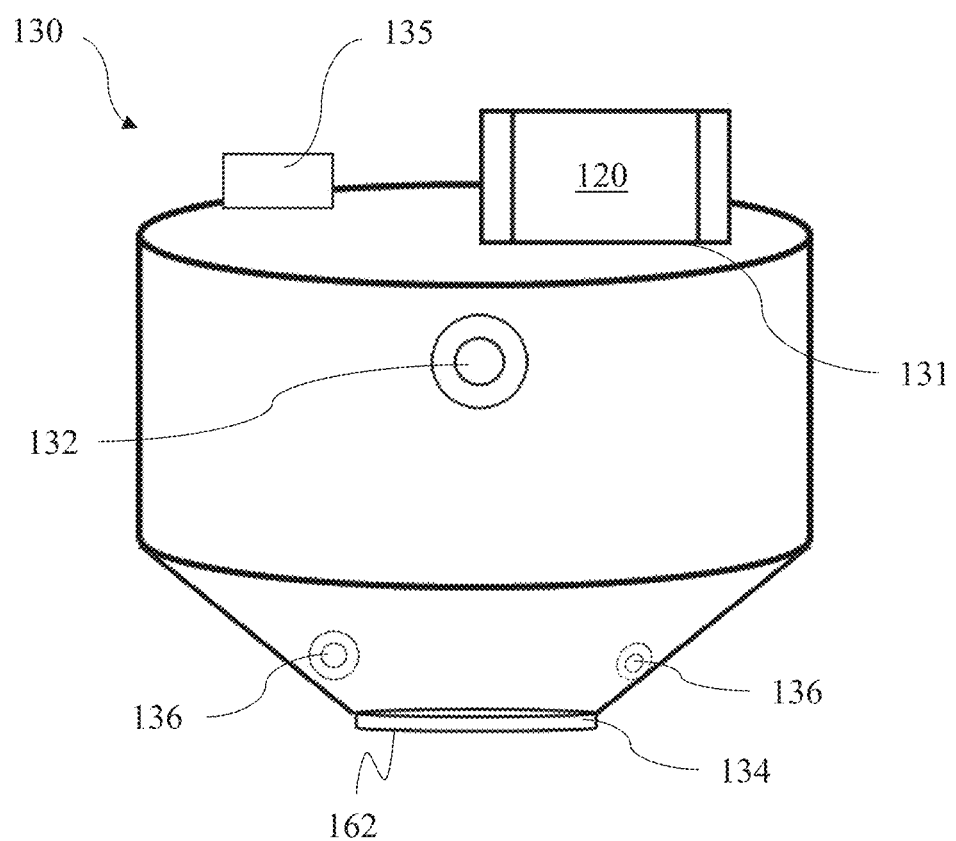
FIG. 5 illustrates a schematic side view of a secondary dehydrating chamber of the waste disposer, according to one embodiment of the subject matter described herein.
Figure 6:
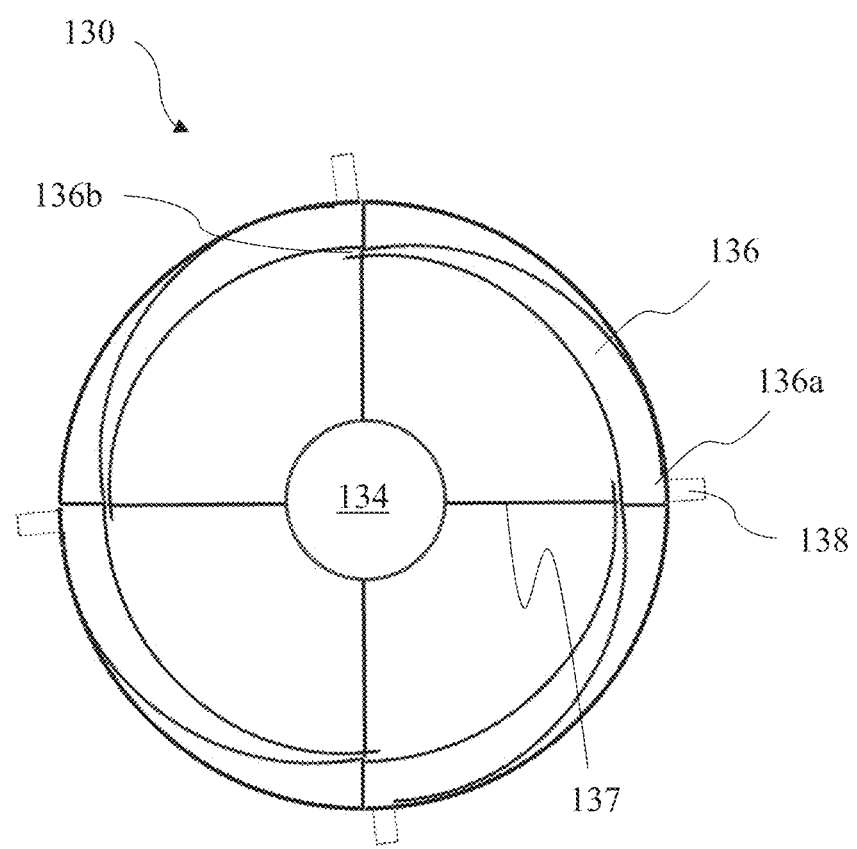
FIG. 6 illustrates a schematic sectional top view the secondary dehydrating chamber.

FIGS. 5 and 6 respectively illustrate schematic side and top views of the secondary dehydrating chamber 130 according to one embodiment of the subject matter described herein. In this embodiment, the secondary dehydrating chamber 130 includes a second waste inlet 131 for receiving the ground waste from the grinding device 120, a second vapor outlet 132 for exhausting vapor from the waste heated in the second dehydrating chamber 130, and a second waste outlet 134 for outputting the further dehydrated waste from the second dehydrating chamber 130.

In this embodiment, the second waste inlet 131 is located atop of the secondary dehydrating chamber 130 to receive the ground waste from above. Typically, the second waste inlet 131 is sized in line with the grinder frame 121 of the grinding device 120, so the secondary dehydrating chamber 130 directly receives the ground waste from the grinding device 120. The second vapor outlet 132 is preferably located at the top of the primary dehydrating chamber 130 because the vapor from the waste has a higher temperature and thus tends to rise. However, it is to be appreciated that the second vapor outlet 132 can be arranged on the side wall of the second dehydrating chamber 130, as FIG. 5 shows. The second waste outlet 134 is preferably located at the bottom or at least close to the lowest portion of the secondary dehydrating chamber 130, so that the waste can enter the storage chamber 140 by gravity below the secondary dehydrating chamber 130 after dehydration.

In one embodiment, as shown in FIG. 6, a number of air ducts 136 and a number of air outlets 137 are formed through the wall of the secondary dehydrating chamber 130. Each of the air ducts 136 has an outer end 136a coupled to an air blower (not shown) and an inner end 136b accessing to an internal space of the secondary dehydrating chamber 130. The air blower is communicative with the controller, which is programmed to operate the air blower to form a cyclone inside the secondary dehydrating chamber 130 to drive the ground waste around in the internal space. Preferably, each of the air ducts 136 has a tapered shape towards the internal space of the secondary dehydrating chamber 130 to speed up air flow into the internal space. The air outlets 137 are configured as slots on the surface close to the waste outlet 134 to allow air escape from the bottom of the secondary dehydrating chamber 130. The outer end 136a of the air duct 136 is connected to the air blower through corresponding channels 138. The cyclone formed within the secondary dehydrating chamber 130 is expected to move the ground waste with ease because the weight of each piece of the waste is greatly reduced by the grinding process.

In one embodiment, the heating process in the secondary dehydrating chamber 130 can be realized by microwave radiation. A second microwave inlet 135 can be arranged on the secondary dehydrating chamber 130 to guide microwave generated by the microwave generator via another waveguide (not shown), and the microwaves enter the secondary dehydrating chamber 130 to heat up the ground waste. The microwave generator can be the same one that generates microwave for the primary dehydrating chamber 110, and the controller can be programmed to operate a switching mechanism (not shown) to switch between guidance of microwave towards the primary dehydrating chamber 110 and guidance of microwave towards the secondary dehydrating chamber 130. Although microwaves are generally more effective and efficient to dehydrate the waste, it is to be appreciated that other heating means can be used as well, such as infrared radiation.

In one embodiment, the secondary dehydrating chamber 130 is shaped as a funnel so that the cyclone can be formed more easily at the bottom to blow the ground waste. The cyclone scatters the ground waste from each other so the waste can be dehydrated by the microwave with higher efficiency. The air blower can include a high-speed motor and an impeller, which are commonly used for vacuum cleaners, for example.

A second shield door 162 can be arranged on the second waste outlet 134. The second shield door 162 can be actuated by a second drive motor, which is communicative with the controller to instruct the second drive motor to open or close on the second waste outlet 134. When the waste is being blown and heated in the secondary dehydrating chamber 130, the controller instructs the second drive motor to close the second shield door 162 and thus seal the second waste outlet 134 and prevent the waste from coming out of the secondary dehydrating chamber 130. When the waste has been dehydrated to a certain extent, the controller instructs the microwave generator to stop working and the second drive motor to open the second shield door 162, allowing the waste to be blown or fall into the storage chamber 140.

In one embodiment, humidity and/or temperature sensors can be arranged within the second hydrating chamber 130 to help monitor the change of humidity and/or temperature. These sensors are communicative with the controller, which can be programmed with a humidity threshold for the second dehydrating chamber 130 to determine when the dehydration process should be stopped.

The controller is programmed to control the operation of the second dehydrating chamber 130. The programmed operation of the secondary dehydrating chamber 130 with a humidity sensor is described as follows. When the grinding device 120 stops working, the first waste outlet 114 of the primary dehydrating chamber 110 is closed by the first shield door 161. In the meantime, the controller instructs the switching mechanism to guide the microwaves into the secondary dehydrating chamber 130 via the second microwave inlet 135, and instructs the air blower to start working to force air flow into the air duct 136, which then forms the cyclone within the secondary dehydrating chamber 130. As the ground waste is heated and blown around in the secondary dehydration chamber 130, the humidity sensor detects the humidity within the secondary dehydrating chamber 130 in real time. If the humidity drops below a predetermined threshold, the controller instructs the microwave generator to stop working and the second drive motor to open the second shield door 162, and then the substantially dehydrated waste will be blown or fall into the storage chamber 140.

Similar to the primary dehydrating chamber 110, a temperature threshold can be set for the secondary dehydrating chamber 130 as well to prevent overheat. However, it is to be appreciated that the use of sensors is not necessary, and the user may manually set time durations for the secondary hydration process.

After two stages of dehydration and a grinding process between the two stages of dehydration, typically for kitchen waste that mainly includes left-over food, the volume of the waste can be reduced by about 95% and the weight can be reduced by about 80%, compared with the same amount of waste received at the entrance of the waste disposer. More importantly, each of the two stages of hydration is highly efficient. Typically, 200 grams of organic waste typically requires about 5 minutes for the primary dehydration, and it requires another 5 minutes for the secondary dehydration. The primary dehydration helps remove about 40-50% of moisture from the waste, so the waste is light enough and can be blown around in the secondary dehydrating chamber after the size reduction. The dehydration of the waste disposer according to the embodiments of the subject matter described herein is expected to be much quicker than conventional disposers that crush waste in the first place and heat the waste full of moisture for a long time.

FIG. 7 illustrates a schematic view of a shield door 300 according to one embodiment of the subject matter described herein. As seen in the left schematic view (FIG. 7(a)), a shield door 300 is closed, which includes two halves 310, 320. Each half 310, 320 is moveable by a motor along a guide track 330 as the shield door 300 opens (FIG. 7(b)) or closes. Both the first shield door 161 and the second shield door 162 can be configured as the shield door 300 shown in FIG. 7.

FIG. 8 illustrates a schematic view of a shield door 400 according to another embodiment of the subject matter described herein. A shield door 400 includes a sliding door 410 that seals the corresponding dehydrating chamber in case the shield door 400 is closed (FIG. 8(a)). When the shield door 400 is to be opened, the sliding door 410 is pushed away from (FIG. 8(b)) and then slid along (FIG. 8(c)) the external periphery 420 of the dehydrating chamber as the shield door 400 opens. When the shield door 400 is to be closed, the sliding door 410 is slid along the external periphery 420 of the dehydrating chamber and pulled into the dehydrating chamber as the shield door 400 closes. Both the first shield door 161 and the second shield door 162 can be configured as the shield door 400 shown in FIG. 8.

Figure 9:
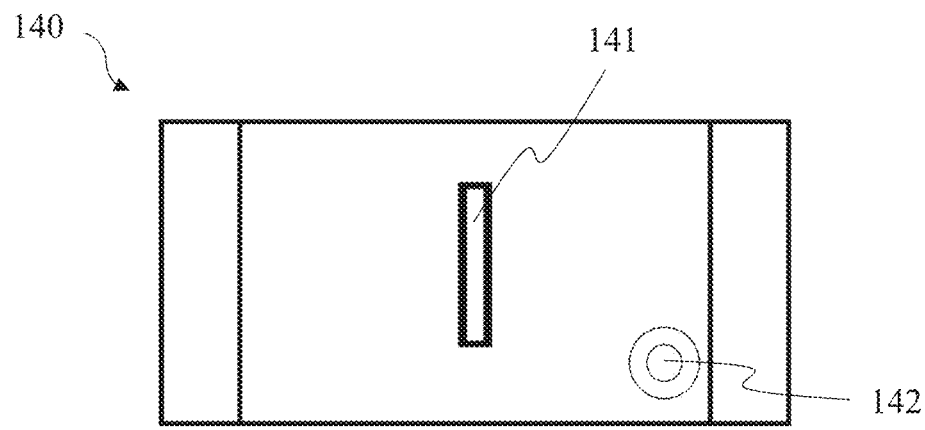
FIG. 9 illustrates a schematic top view of a storage chamber of the waste disposer, according to one embodiment of the subject matter described herein.

FIG. 9 illustrates a schematic view of the storage chamber 140 according to one embodiment of the subject matter described herein. The storage chamber 140 stores the fully dried waste in the form of small particles (normally from 2 to 10 millimeters) received from the secondary dehydrating chamber 130. A handle 141 is provided on one side of the storage chamber 140 so the user can pull the storage chamber 140 from the waste disposer 100. There can be an access 142 so a vacuum cleaner can such the waste within the storage chamber 140 via the access 142.

Figure 10:
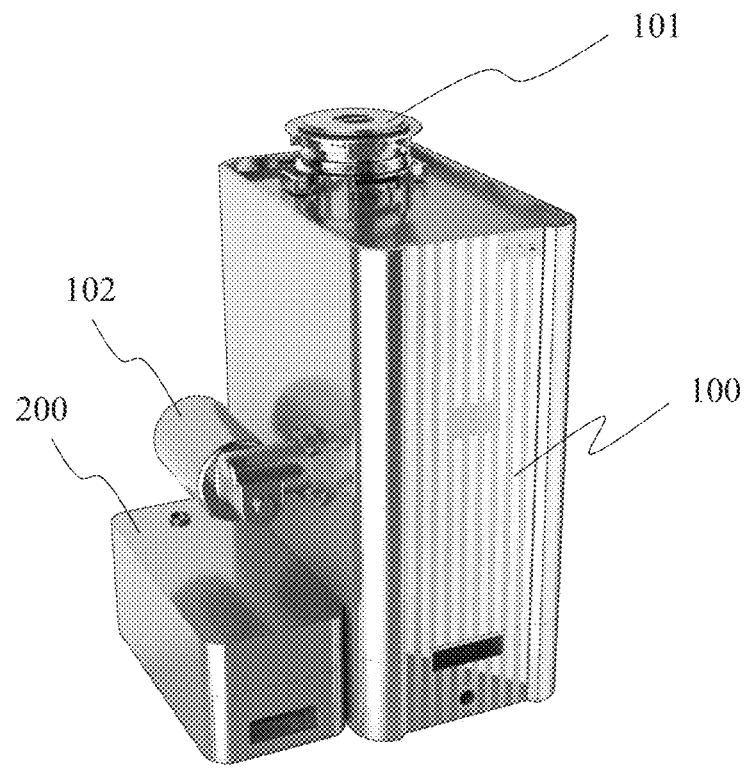
FIG. 10 is a photograph of a prototype of a waste disposer paired with a water filtration device according to one embodiment of the subject matter described herein.

FIG. 10 illustrates an example photo of a prototype of the waste disposer 100 paired with a water filtration device 200 according to one embodiment of the subject matter described herein. There is an entrance lid 101 on the top of the waste disposer 100, and the waste disposer 100 can start working in response to the entrance lid 101 being opened and closed on the top of the waste disposer 100. In this example, there can be a grinding motor 102 out of the main body of the waste disposer 100 for driving the grinders of the grinding device within the waste disposer 100. However, it is appreciated that the grinding motor 102 can be placed within the waste disposer 100 as long as there is enough room in the waste disposer 100. In this example, the waste disposer 100 is compact and has a height of about 440 millimeters only.

In one embodiment, the water filtration device 200 receives the vapor evaporated from the waste within the primary and secondary dehydrating chambers of the waste disposer 100. There can be a mixture of gas and vapor entering the water filtration device 200. A water tank may be contained within the water filtration device 200 and vapor and gas from the waste disposer 100 enters water in the water tank. Zeolite and bleach components may be put in the water to absorb and remove undesirable odor from the vapor. This can be important if the waste disposer is used to dispose excrement. After the filtration, gas and vapor can be emitted into the atmosphere. However, it is to be appreciated that, in some situations the water filtration device 200 is not necessary, especially when disposing organic waste.

It is to be appreciated that various components in embodiments of the subject matter described herein need to be actuated by motors and other electrical/electronic components. These components can be selected based on specific requirements and can be placed in or out of the housing of the waste disposer. The waste disposer can be powered by mains supply and/or can be powered by a battery. In some use environments, the waste disposer may be installed under a basin in the kitchen or under a toilet. In some other use environments, the waste disposer may be installed separately as a stand-alone device.

Figure 11:
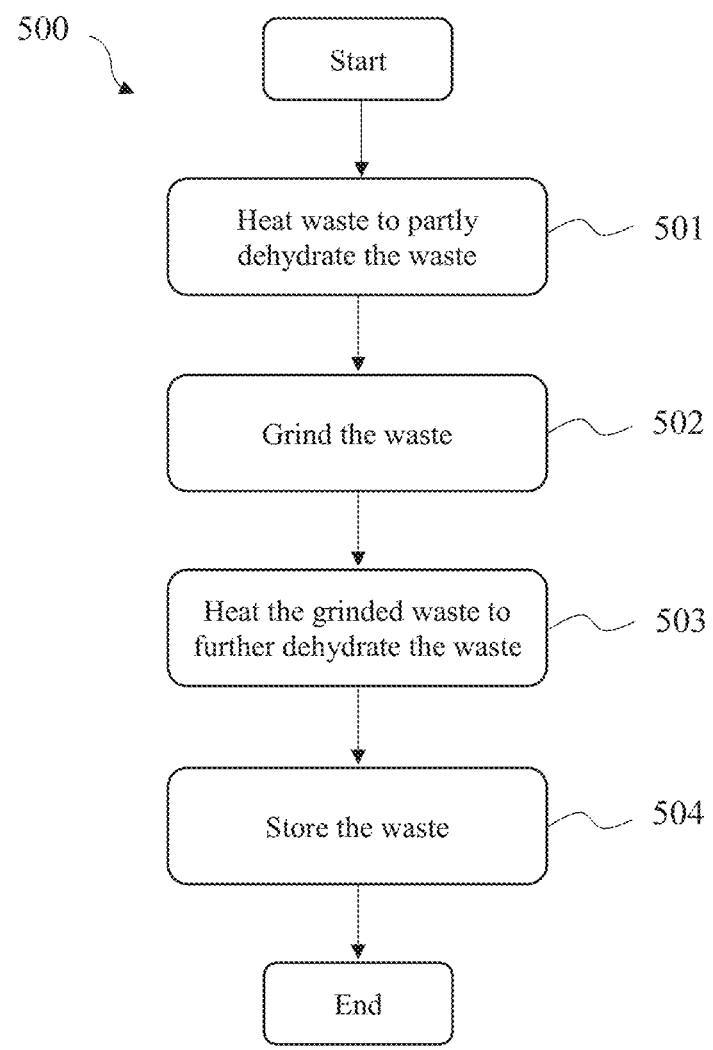
FIG. 11 illustrates a block diagram of a method of disposing waste using the waste disposer, in accordance with embodiments of the subject matter described herein.

With reference to FIG. 11, it illustrates a block diagram of a method 500 of disposing waste in accordance with embodiments of the subject matter described herein. At step 501, waste is heated in a primary dehydrating chamber to partly dehydrate the waste, the waste including organic waste and/or excrement. Vapor from the waste is exhausted through a first vapor outlet on the primary dehydrating chamber, free liquid from the waste is drained through a drainage outlet on the primary dehydrating chamber, and the partly dehydrated waste is output through a first waste outlet on the primary dehydrating chamber. At step 502, the waste received from the first waste outlet of the primary dehydrating chamber is grinded with a grinding device to reduce the size of the waste. At step 503, the ground waste is heated in a secondary dehydrating chamber to further dehydrate the waste received from the grinding device. Vapor from the waste is exhausted through a second vapor outlet on the secondary dehydrating chamber and the further dehydrated waste is output through a second waste outlet on the second dehydrating chamber. At step 504, the waste received from the second waste outlet of the secondary dehydrating chamber is stored in a storage chamber.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A waste disposer for disposing waste having a liquid content, the waste disposer comprising:
    a heater operable to vaporize at least some liquid in the waste;
    a primary dehydrating chamber thermally communicative with the heater and comprising:
        a first waste inlet for receiving the waste,
        a first vapor outlet for exhausting vaporized liquid from the waste heated in the primary dehydrating chamber,
        a drainage outlet for draining free liquid from the waste, and
        a first waste outlet for outputting a partly dehydrated waste from the primary dehydrating chamber;
    a grinding device communicative with the first waste outlet and for grinding the partly dehydrated waste; and
    a secondary dehydrating chamber thermally communicative with the heater and comprising:
        a second waste inlet communicative with the grinding device and for receiving a ground partly dehydrated waste,
        a second vapor outlet for exhausting vaporized liquid from the ground partly dehydrated waste heated in the secondary dehydrating chamber, and
        a second waste outlet for outputting a ground further dehydrated waste from the secondary dehydrating chamber;
    wherein the heater comprises a microwave generator and a waveguide connecting the microwave generator to a first microwave inlet on the primary dehydrating chamber and to a second microwave inlet on the secondary dehydrating chamber.

2. The waste disposer according to claim 1, further comprising a storage chamber communicative with the second waste outlet, for receiving the ground further dehydrated waste.

3. The waste disposer according to claim 1, further comprising a controller, a first temperature sensor in the primary dehydrating chamber and communicative with the controller, and a second temperature sensor in the secondary dehydrating chamber and communicative with the controller, the controller having a memory with program code that when executed instructs the microwave generator to stop generating microwaves when a temperature detected by the first temperature sensor reaches a first level or the temperature detected by the second temperature sensor reaches a second level.

4. The waste disposer according to claim 1, wherein the primary dehydrating chamber comprises an outer shell, the first waste inlet and the first vapor outlet being located at a top of the outer shell while the drainage outlet and the first waste outlet being located at a bottom of the outer shell, and wherein the primary dehydrating chamber further comprises an inner shell having an exit coupling to the first waste outlet on the outer shell and a stirrer movable within the inner shell for stirring waste therein.

5. The waste disposer according to claim 4, wherein the inner shell comprises a filter communicative with the drainage outlet and comprising at least one of a plurality of apertures and a plurality of scales.

6. The waste disposer according to claim 4, wherein the stirrer comprises at least one arm that is rotatable around the inner shell.

7. The waste disposer according to claim 6, wherein the at least one arm of the stirrer has a shape following a shape of the inner shell and is spaced from the inner shell to define a gap.

8. The waste disposer according to claim 6, wherein a surface of the at least one arm is texturized to diffusely reflect microwaves within the primary dehydrating chamber.

9. The waste disposer according to claim 4, wherein the stirrer is rotatable between 0 and 30 RPM.

10. The waste disposer according to claim 1, further comprising a first shield door on the first waste outlet, and a first drive motor operable to actuate the first shield door to open or close the first waste outlet.

11. The waste disposer according to claim 10, further comprising a second shield door on the second waste outlet, and a second drive motor operable to actuate the second shield door to open or close on the second waste outlet.

12. The waste disposer according to claim 11, further comprising a first humidity sensor in the primary dehydrating chamber and communicative with a controller, and a second humidity sensor in the secondary dehydrating chamber and communicative with the controller, and wherein a program code when executed instructs the first shield door to open when a humidity detected by the first humidity sensor drops below a first threshold and the second shield door to open when a humidity detected by the second humidity sensor drops below a second threshold.

13. The waste disposer according to claim 11, wherein each of the first and second shield doors comprises two portions, each portion being moveable along a guide track as the first shield door or the second shield door opens or closes.

14. The waste disposer according to claim 11, wherein each of the first and second shield doors comprises a sliding door.

15. The waste disposer according to claim 1, wherein the grinding device comprises a grinder motor, a grinder frame comprising a pair of laterally spaced drive shafts coupled to the grinder motor, and a plurality of grinders mounted to the drive shafts in a staggered manner.

16. The waste disposer according to claim 15, wherein each of the plurality of grinders has a spindle shape with two opposing faces each comprising a plurality of distributed protrusions, and a circumferential edge comprising a plurality of spaced teeth.

17. The waste disposer according to claim 1, wherein the second waste inlet and the second vapor outlet are located at a top of the secondary dehydrating chamber while the second waste outlet is located at a bottom of the secondary dehydrating chamber.

18. The waste disposer according to claim 1, further comprising a blower, and wherein the secondary dehydrating chamber further comprises a plurality of air ducts and a plurality of air outlets, each of the plurality of air ducts fluidly communicative with the blower and positioned to create a cyclone inside the secondary dehydrating chamber when the blower is operating.

19. The waste disposer according to claim 18, wherein each of the air ducts has a tapered shape facing an interior of the secondary dehydrating chamber to speed up air flow therein.

20. The waste disposer according to claim 1, wherein the first waste outlet is arranged on the primary dehydrating chamber to span from a bottom of the primary dehydrating chamber to between ⅓ to ½ of an overall height of the primary dehydrating chamber.

21. The waste disposer according to claim 1, further comprising a water filtration device fluidly coupled to the first and second vapor outlets and operable to filter water from the vaporized liquid.

22. A method of disposing waste having a liquid content, comprising:
- in a primary dehydrating chamber, heating the waste until at least some of the liquid content is vaporized and draining free liquid from the waste, to produce a partly dehydrated waste, wherein the vaporized liquid content is exhausted through a first vapor outlet on the primary dehydrating chamber, the free liquid is drained through a drainage outlet on the primary dehydrating chamber, and a heater comprises a microwave generator and a waveguide connecting the microwave generator to a first microwave inlet on the primary dehydrating chamber;
- grinding the partly dehydrated waste to produce ground partly dehydrated waste; and
- in a secondary dehydrating chamber, heating the ground partly dehydrated waste to further vaporize the liquid content and produce a ground further dehydrated waste, wherein the further vaporized liquid content is exhausted through a second vapor outlet on the secondary dehydrating chamber, and the waveguide connects the microwave generator to a second microwave inlet on the secondary dehydrating chamber.

23. The method as claimed in claim 22, further comprising storing the ground further dehydrated waste in a storage chamber.

\* \* \* \* \*